United States Patent
Shiao et al.

(10) Patent No.: US 7,313,188 B2
(45) Date of Patent: Dec. 25, 2007

(54) SUBCARRIER TIME OFFSETS FOR IMPROVED PEAK-TO-AVERAGE POWER OF A TRANSMITTER

(75) Inventors: Stephen S. Shiao, Coral Springs, FL (US); Michael N. Kloos, Belvidere, IL (US); Michael J. Rudowicz, Lake Worth, FL (US); Patrick J. Doran, Fairfax, VA (US)

(73) Assignee: Motorola, Inc., Schaumburg, IL (US)

( * ) Notice: Subject to any disclaimer, the term of this patent is extended or adjusted under 35 U.S.C. 154(b) by 695 days.

(21) Appl. No.: 10/610,107

(22) Filed: Jun. 30, 2003

(65) Prior Publication Data

US 2004/0264586 A1    Dec. 30, 2004

(51) Int. Cl.
 *H04L 27/28*    (2006.01)
(52) U.S. Cl. ..................................... 375/260
(58) Field of Classification Search ............... 375/260, 375/142, 346; 370/208; 455/63.3; 398/182
See application file for complete search history.

(56) References Cited

U.S. PATENT DOCUMENTS

| | | | | |
|---|---|---|---|---|
| 4,464,767 A | * | 8/1984 | Bremer | 375/298 |
| 4,881,241 A | * | 11/1989 | Pommier et al. | 375/260 |
| 5,177,767 A | * | 1/1993 | Kato | 375/142 |
| 5,381,449 A | | 1/1995 | Jasper et al. | |
| 5,596,604 A | * | 1/1997 | Cioffi et al. | 375/260 |
| 6,091,936 A | * | 7/2000 | Chennakeshu et al. | 455/63.3 |
| 6,147,984 A | | 11/2000 | McCoy | |
| 2002/0085640 A1 | * | 7/2002 | Humphrey | 375/260 |
| 2003/0147655 A1 | * | 8/2003 | Shattil | 398/182 |
| 2003/0210647 A1 | * | 11/2003 | Yang et al. | 370/208 |

FOREIGN PATENT DOCUMENTS

WO    WO 01/35591    5/2001

* cited by examiner

*Primary Examiner*—Don N. Vo (57) ABSTRACT

A system, wireless device (102) and method reduce the peak-to-average power of a transmitter by creating at least two sampled carrier data streams, running each carrier through a separate delay block, mixing each carrier over in frequency an appropriate amount, resulting in at least two frequency division multiplexed signals, and combining the at least two frequency division multiplexed signals together. The four sampled carrier data streams may each have a bandwidth of 25 kHz. Each separate delay block is less than 20% of its corresponding symbol time. The transmitter may be used to transmit wideband integrated digitally enhanced network (WiDEN) signals.

13 Claims, 6 Drawing Sheets

SUBCARRIER TIME OFFSETS FOR IMPROVED PEAK-TO-AVERAGE POWER OF A TRANSMITTER

FIELD OF THE INVENTION

The present invention generally relates to the field of wireless communications, and more particularly relates to a method to improve the peak-to-average power ratio (PAR) of an integrated Digital Enhanced Network (iDEN) system using subcarrier time offsets.

BACKGROUND OF THE INVENTION

Many wireless telecommunications systems, i.e. cellular communications networks, are divided into a series of cells that provide coverage for a particular service area. Each cell is contains a base station, which communicates with mobile subscriber users on an operating frequency set comprising a plurality of radio channels. Each channel represents an information signal at a particular frequency. In order to improve the usage efficiency of the channel, many coding schemes and networks divide the channel slot (or band) into multiple sub-channels (subcarriers), allowing for more subscribers to operate in the same bandwidth. Motorola's iDEN (integrated Digital Enhanced Network) is an example of this type of system.

However, a multiple carrier Wideband integrated Digital Enhanced Network (WiDEN) signal suffers from poor peak-to-average power ratio (PAR) due to the signal being composed of two to four combined 25 kHz iDEN slot formats, each separated by 25 kHz. The sync and pilot symbols occur at the same symbol times and phases in both subcarriers. This is desirable for maintaining compatibility with the current iDEN slot format, but contributes to poor PAR.

Peak to average ratio compression is a technique for improving average power levels from an amplifier with limited peak power capability. However, the additive nature of having the sync and pilot symbols occur simultaneously in both subcarriers creates large peak power levels, thereby reducing the overall effective output power level of the transmitter. Typical methods of lowering PAR, such as adaptive gain control and hard or soft clipping, create splatter, which impacts adjacent channel power specs and may raise the noise floor of the transmitted signal.

SUMMARY OF THE INVENTION

Briefly, in accordance with preferred embodiments of the present invention, disclosed are a system, method, wireless device, and computer readable medium for improving the peak-to-average power ratio (PAR) of an integrated Digital Enhanced Network (iDEN) system using subcarrier time offsets. In accordance with a preferred embodiment of the present invention, a system, computer readable medium, wireless device, and method reduce the peak-to-average power of a transmitter by creating at least two sampled carrier data streams, running each carrier through a separate delay block, mixing each carrier over in frequency an appropriate amount, resulting in at least two frequency division multiplexed signals, and combining the at least two frequency division multiplexed signals together. The at least two sampled carrier data streams may each have a bandwidth of 25 kHz. Each separate delay block may be less than approximately 20% of its corresponding symbol time. The transmitter may be used to transmit wideband integrated digitally enhanced network (WiDEN) signals.

The preferred embodiments of the present invention are advantageous because they improve the peak-to-average power ratio (PAR) of a transmitted signal without degrading the adjacent channel power level performance (increasing splatter). The sync and pilot symbols associated with each of the subcarriers of the transmitted signal are designed to have large amplitudes to aid in their detection. These sync and pilot symbols are typically transmitted at the same time on all of the subcarriers. When the individual mixer phases associated with each of the subcarriers align, the large amplitudes associated with the sync and pilot symbols produce peaks in the composite signal. Since, in the present invention, the subcarrier symbols are slightly delayed in time relative to each other, the mixed sync/pilot symbols on each of the subcarriers do not add together to form as many peaks. Thus, a composite signal with fewer peaks would require less peak reduction, resulting in less splatter (AC-CPR). This allows for more aggressive peak reduction processing while meeting the same splatter requirement (ACCPR), resulting in a transmit signal with improved PAR.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, advantageously overcomes problems with the prior art by delaying one of the subcarriers in time relative to the other. As long as the delays are kept small with respect to the symbol timing, the overall effect on the system is minimal. For example, a 50 kHz WiDEN transmitter utilizing this invention will look identical to two separate 25 kHz iDEN transmitters each transmitting at slightly different time. The delays are small with respect to the symbol timing and are within current system specifications for 50 kHz WiDEN transmissions.

For example, simulations discussed below delay one subcarrier 27 usecs relative to the other. The symbol time for either subcarrier is 250 usecs. This time delay has the effect of lowering the PAR of the combined signal since the syncs and pilot symbols no longer sum together at exactly the same time instant.

Figure 1:
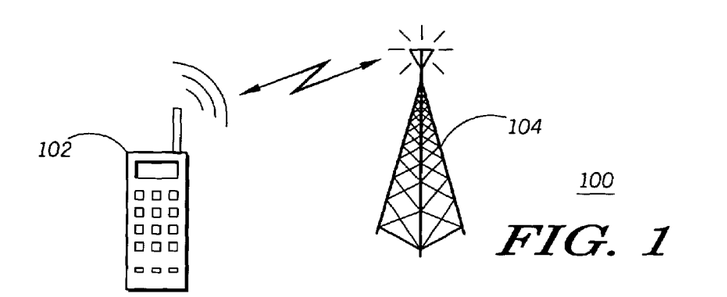
FIG. 1 is a block diagram illustrating a communications system incorporating improved peak-to-average power ratio (PAR) performance using subcarrier time offsets, according to a preferred embodiment of the present invention
Figure 2:
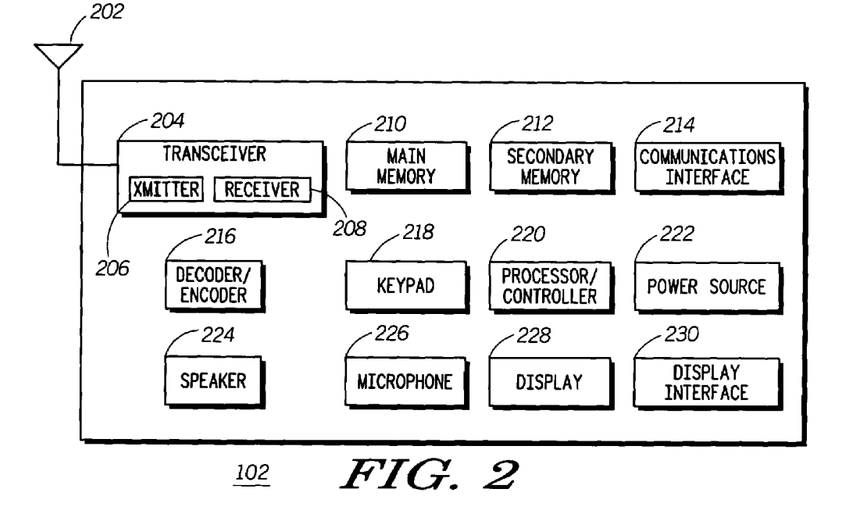
FIG. 2 is a more detailed block diagram illustrating a mobile communication device of the system of FIG. 1, according to a preferred embodiment of the present invention.

Referring to FIG. 1, a preferred embodiment of the present invention consists of at least one wireless mobile subscriber device (or wireless device) 102, operating within range of a cellular base station 104. A block diagram of an exemplary mobile subscriber device 102 is shown in FIG. 2. The wireless device 102 contains an antenna 202, at least one transceiver 204, having a transmitter 206 and a receiver 208, and a decoder/encoder 216 designed to transmit, receive, encode and decode wireless signals for the frequencies and characteristics of its corresponding system.

Figure 3:
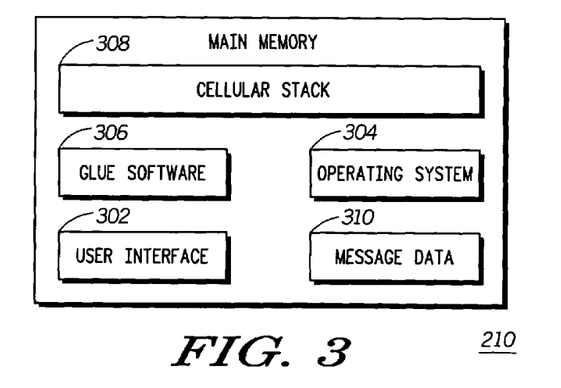
FIG. 3 is a block diagram illustrating the contents of an exemplary main memory of a mobile communication device of the system of FIG. 1, according to a preferred embodiment of the present invention.

The mobile subscriber unit 102 also includes one or more processor/controllers 220, which processes instructions, performs calculations, and manages the flow of information through the SU 102. The SU 102 also includes a main memory 210 containing a program memory and a data memory, preferably random access memory (RAM), and may also include a secondary memory 212. Additionally, the processor 220 is communicatively coupled with the main memory 210. Included within the main memory 210, shown in more detail in FIG. 3, are a user interface 302, operating system platform 304, a cellular stack 308 and glue software 306. The operating system platform 304 manages resources, such as the message data 310 stored in data memory, the scheduling of tasks, and processes the operation of the cellular stack 308 in the program memory.

The operating system platform 304 also manages a graphical and/or character-based display interface 230 that, according to the present example, controls a display screen 228. Information is displayed to a user of the SU 102 via the screen 228, for visual output of information, and a speaker 224, for audible output. A user input interface comprises a keypad 218 and a microphone 226 for receiving input from a user of the SU 102. Additionally, the operating system platform 304 also manages many other basic tasks of the subscriber unit 102 in a manner well known to those of ordinary skill in the art.

Glue software 306 may include drivers, stacks, and low-level application programming interfaces (API's) and provides basic functional components for use by the operating system platform 304 and by compatible applications that run on the operating system platform 304 for managing communications with resources and processes in the wireless device 102.

The exemplary wireless device 102 also contains a power source 222 for powering the wireless device 102, such as a battery, DC adapter, or AC adapter.

In alternative embodiments, the secondary memory 212 may include other similar means for allowing computer programs or other instructions to be loaded into the SU 306. Such means may include, for example, a removable storage unit and an interface (not shown). Examples of such may include a program cartridge and cartridge interface (such as that found in video game devices), a removable memory chip (such as an EPROM, or PROM) and associated socket, and other removable storage units and interfaces that allow software and data to be transferred from the removable storage unit to the SU 306.

In this document, the terms "computer program medium," "computer-usable medium," "machine-readable medium" and "computer-readable medium" are used to generally refer to media such as main memory 210 and secondary memory 212, removable storage drive, a hard disk installed in hard disk drive, and signals. These computer program products are means for providing software to the mobile subscriber unit 102. The computer-readable medium allows the SU 102 to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Various software embodiments are described in terms of this exemplary system. After reading this description, it will become apparent to a person of ordinary skill in the relevant art(s) how to implement the invention using other computer systems and/or computer architectures.

Figure 4:
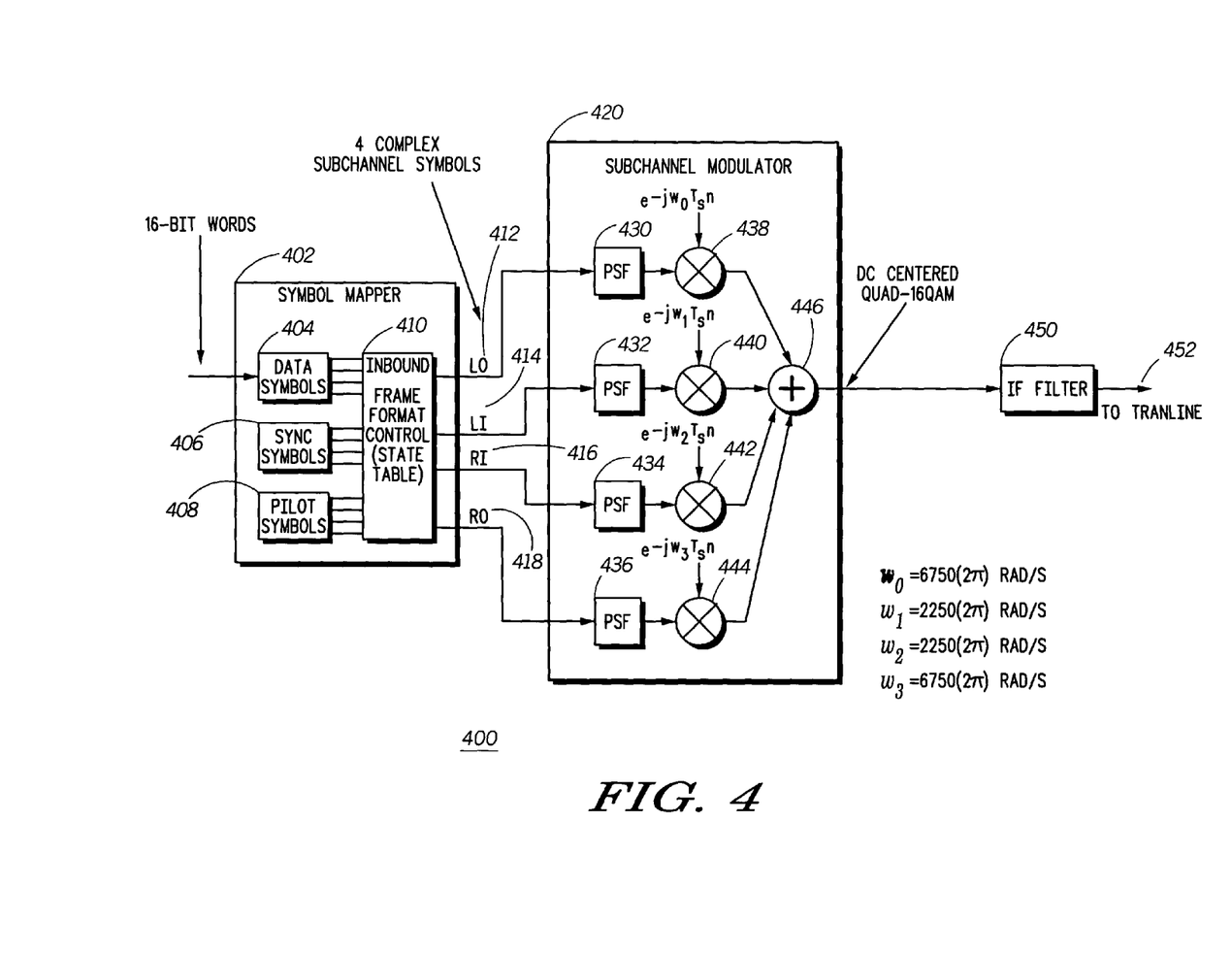
FIG. 4 is a more detailed block diagram illustrating a single 25 kHz transmitter of the mobile communication device of the system of FIG. 1, according to a preferred embodiment of the present invention.
Figure 5:
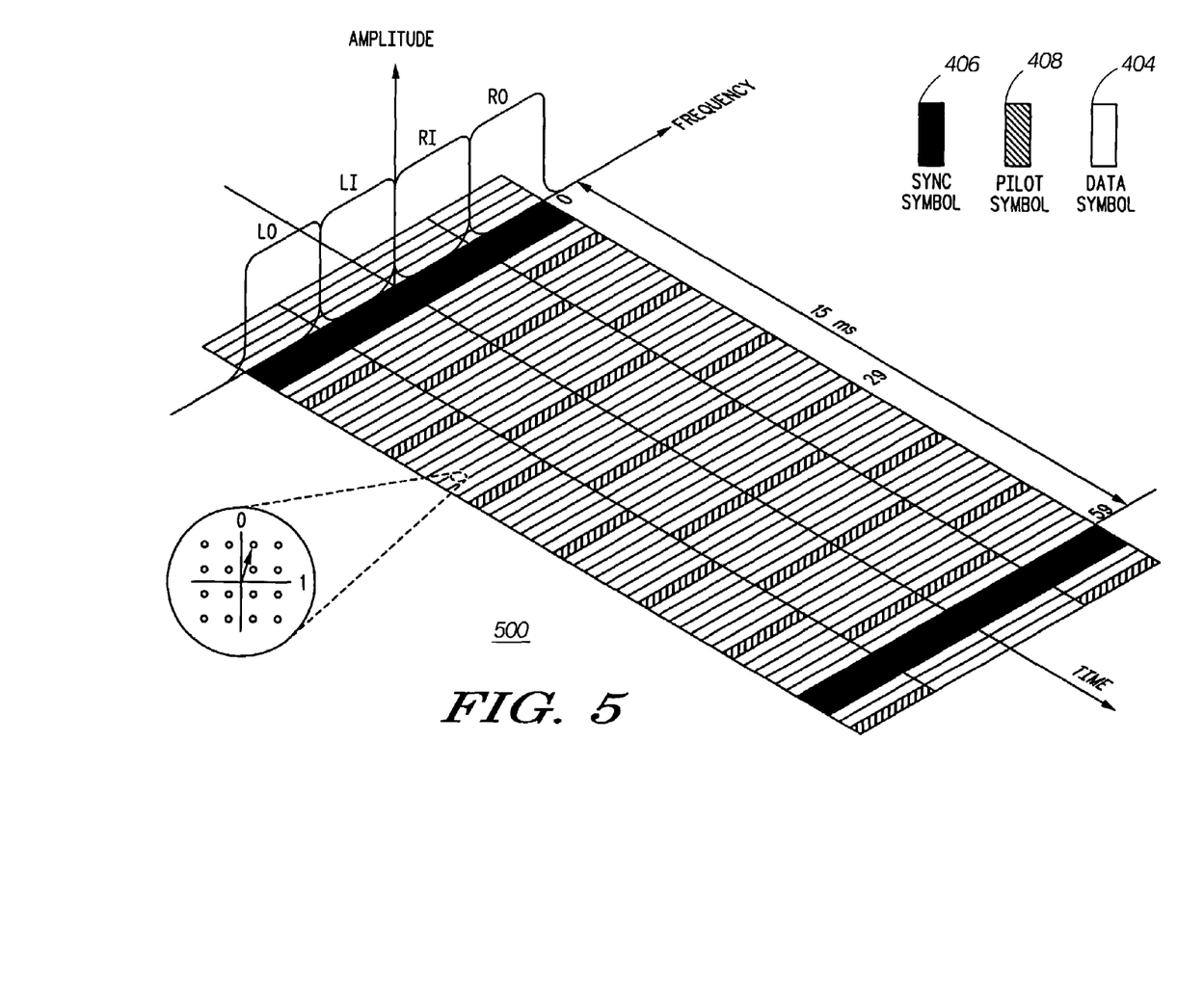
FIG. 5 is a timing diagram illustrating an exemplary 25 kHz outbound slot format of a signal transmitted, according to a preferred embodiment of the present invention.

FIG. 4 illustrates a typical iDEN transmitter used for one of the 25 kHz carriers in the system of FIG. 1. A symbol mapper 402 creates four sampled subchannels 412, 414, 416, 418 by combining data symbols 404 with sync symbols 406 and pilot symbols 408 according to an outbound frame format control (state table) 410 as shown in FIG. 5. The separate subchannels 412, 414, 416, 418 are sent to a subchannel modulator 420 where they are each then sent through independent pulse shaping filters (PSF) 430, 432, 434, 436 and mixed with offset frequencies to move the signal over in frequency an appropriate amount. For example, in FIG. 4, subchannel LO 412 is mixed over −6750 Hz, LI 414 is mixed −2250 Hz, RI 416 is mixed 2250 Hz and RO 418 is mixed 6750 Hz, resulting in a total carrier bandwidth of 25 kHz. The four frequency division multiplexed signals 438, 440, 442, 444 are then combined by a signal combiner 446 and filtered by an intermediate frequency filter 450 to form a complete signal 452 for transmission.

Figure 6:
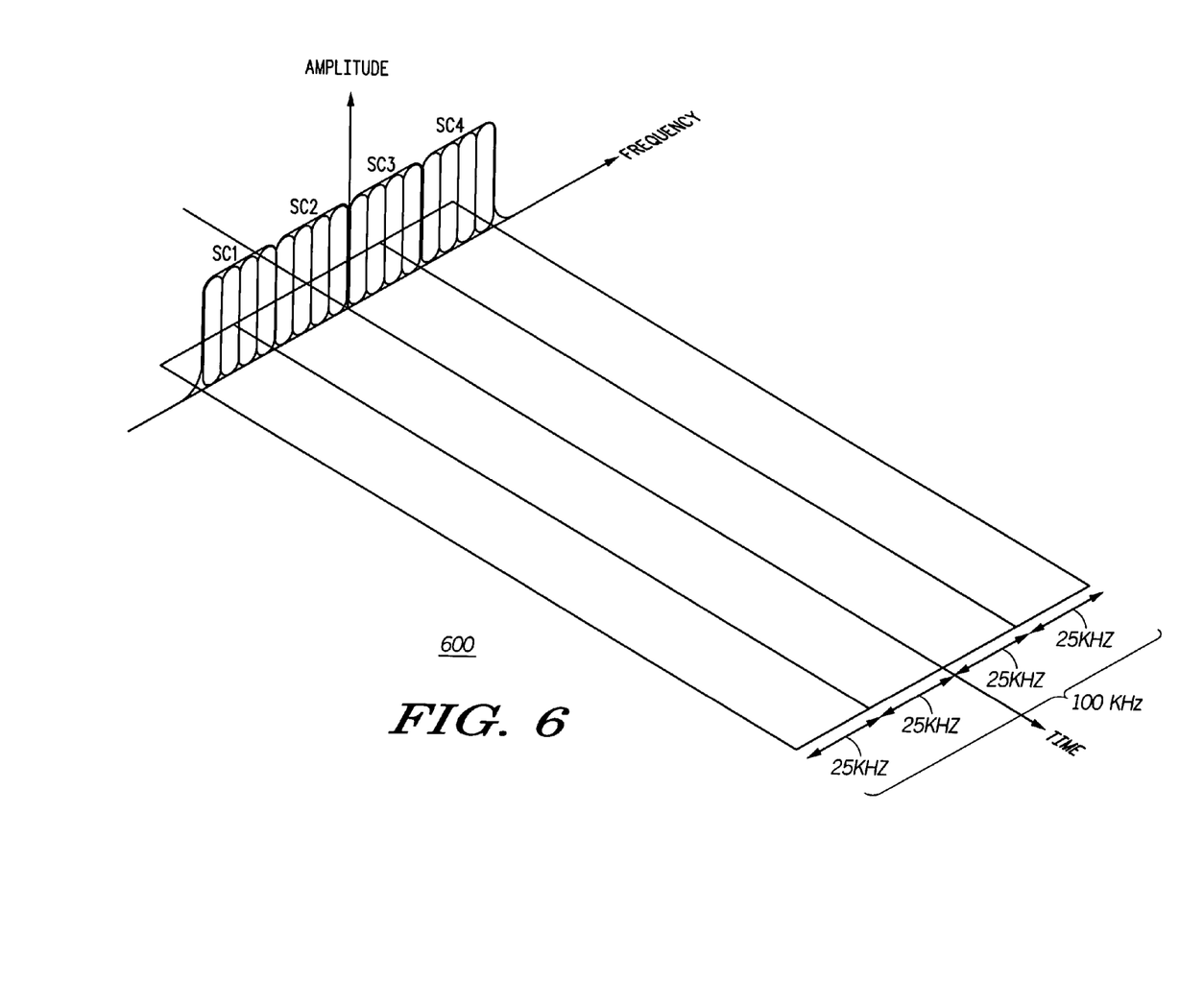
FIG. 6 is a timing diagram illustrating an exemplary 100 kHz outbound slot format of a signal transmitted, according to a preferred embodiment of the present invention

FIG. 5 illustrates a typical 25 kHz outbound slot format of a transmission signal. A 100 kHz WiDEN system, would be comprised of four such signals spaced 25 kHz apart as shown in FIG. 6. Note how the sync symbols 406 and pilot symbols 408 occupy the same position in time. With a preferred embodiment of the present invention, these symbols are delayed slightly (with respect to each other) and therefore, the power levels associated with transmitting each symbol do not add directly, resulting in decreased peak power levels. This improves the peak-to-average power ratio of the transmitted signal which, in turn, improves the efficiency of the power amplifier by allowing it to operate with a higher average transmit power.

Figure 7:
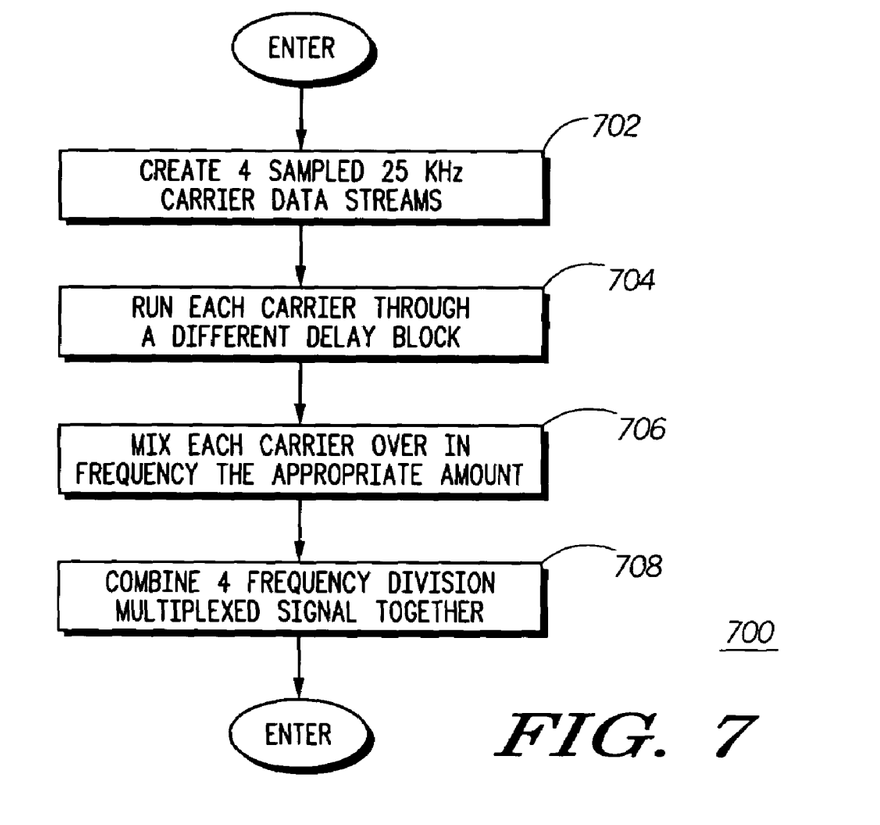
FIG. 7 is an operational flow diagram illustrating portions of a transmitting process using subcarrier time offsets, according to a preferred embodiment of the present invention.
Figure 8:
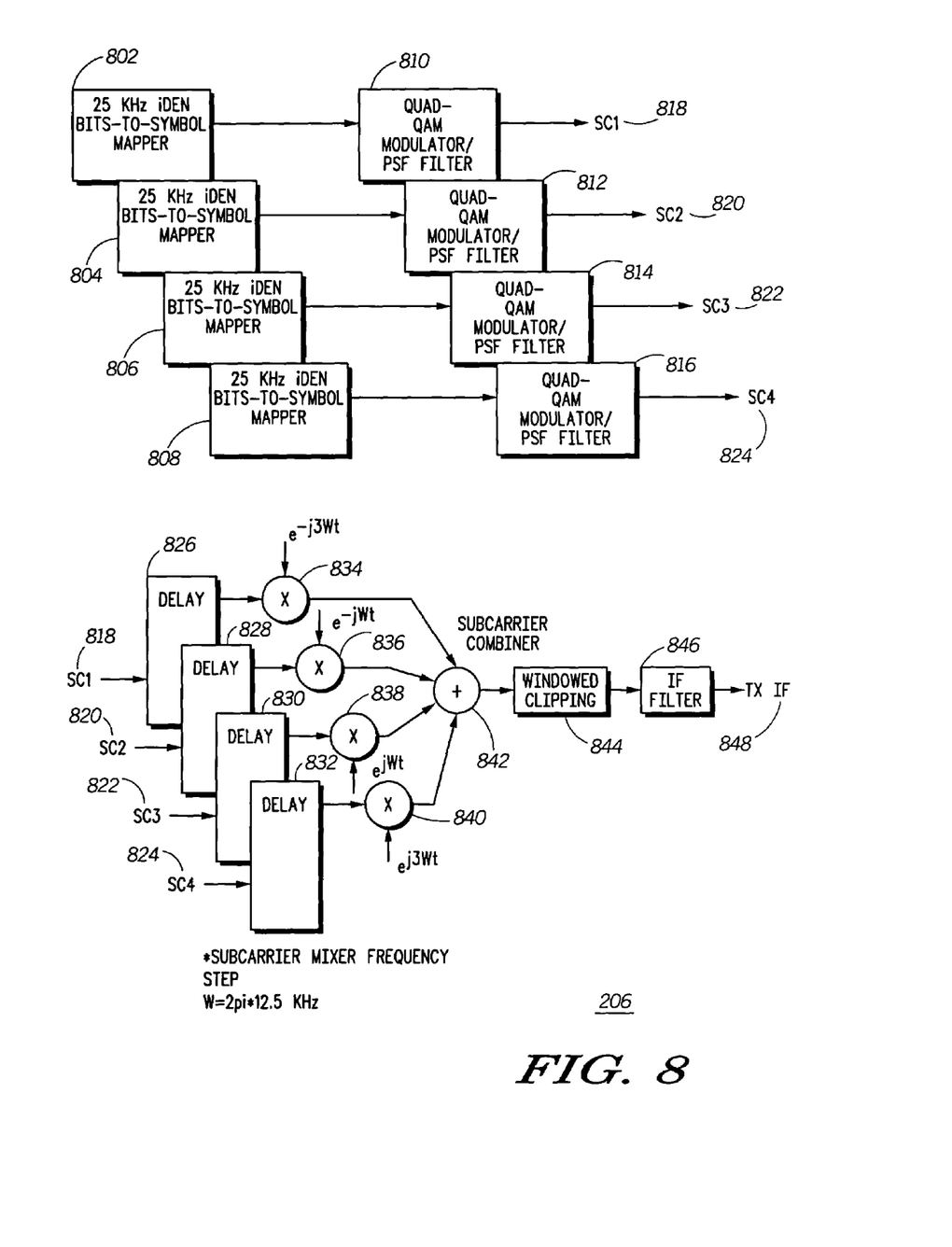
FIG. 8 is a more detailed block diagram illustrating a 100 kHz WIDEN transmitter of the mobile communication device of the system of FIG. 1, according to a preferred embodiment of the present invention.

FIGS. 7 and 8 illustrate an exemplary transmitter and operational flow diagram for transmitting a 100 kHz composite WiDEN signal as shown in FIG. 6. Although the following discussion refers to a 100 kHz system, it should be obvious to one skilled in the arts that similar means may be used to create systems having other bandwidths. A preferred method of the present invention begins, at step 702, when four sampled 25 kHz carrier data streams 818, 820, 822, 824 are created as described in FIG. 4, by feeding 25 kHz iDEN bit words through symbol mappers 802, 804, 806, 808 and Quad-QAM modulators/PSF filters 810, 812, 814, 816. The separate data streams 818, 820, 822, 824 are each run through a different delay block 826, 828, 830, 832, at step 704. The delays are preferably kept under 20% of the symbol time in order to attain improved peak-to-average power ratio performance and decreased adjacent channel power levels without degrading other performance characteristics. The delayed signals are then mixed with offset frequencies by four separate mixers 834, 836, 838, 840 to move the signal over in frequency an appropriate amount, at step 706. The four frequency division multiplexed signals are then combined, at step 708 by a signal combiner 842 to form a complete signal for transmission.

The above method may also be used in conjunction with other prior art methods, such as Motorola's proprietary window clipping technique 844 for reducing PAR, and filtered by an intermediate frequency filter 846 before transmitting the final signal 848.

The present invention can be realized in hardware, software, or a combination of hardware and software. An embodiment of the present invention can also be embedded in a computer program product, which comprises all the features enabling the implementation of the methods described herein, and which, when loaded in a computer system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Computer programs (also called computer control logic) are stored in main memory 210 and/or secondary memory 212. Computer programs may also be received "over-the-air" via one or more wireless receivers. Such computer programs, when executed, enable the subscriber unit 102 to perform the features of the present invention as discussed herein. In particular, the computer programs, when executed, enable the processor 220 to perform the features of the wireless device 102. Accordingly, such computer programs represent controllers of the wireless device 102.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments.

Furthermore, it is intended that the appended claims cover any and all such applications, modifications, and embodiments within the scope of the present invention.

What is claimed is:

1. A method for reducing a peak-to-average power ratio of a transmitter amplifier, the method comprising:
creating a plurality of sampled carrier data streams;
running each one of the plurality of sampled carrier data streams through a separate delay block to add a delay to the each one relative to each remaining of the plurality of sampled carrier data streams to provide each delayed one of the plurality of sampled carrier data streams, and wherein each separate delay block adds delay of less than 20% of a corresponding symbol time;
mixing each delayed one of the plurality of sampled carrier data streams over in frequency an appropriate frequency amount relative to the remaining of the plurality of sampled carrier data streams, resulting in a plurality of frequency division multiplexed signals; and
combining the plurality of frequency division multiplexed signals together.

2. The method of claim 1, wherein the plurality of sampled carrier data streams comprises at least two sampled carrier data streams each comprising a bandwidth of 25 kHz.

3. The method of claim 1, further comprising transmitting the frequency division multiplexed signals together as a plurality of wideband integrated digitally enhanced network (WiDEN) signals.

4. A transmitter comprising:
at least two symbol mappers, each symbol mapper having at least four outputs, for creating at least four subchannels;
at least two subchannel modulators, each subchannel modulator communicatively coupled to a corresponding symbol mapper, for creating at least two sampled carrier data streams;

at least two separate delay blocks, each block communicatively coupled to a subchannel modulator, for delaying in time each sampled carrier data stream relative to each other to provide at least two separate delayed carriers;

at least two predetermined offset frequency signals;

at least two mixers, each mixer communicatively coupled to a delay block and to a predetermined offset frequency signal, for mixing each delayed carrier over in frequency an appropriate amount; and a signal combiner, communicatively coupled to each mixer of the at least two mixers, for combing the at least two mixed delayed carriers into a single combined signal.

5. The transmitter of claim 4, wherein each separate delay block adds a delay of less than 20% of a corresponding symbol time.

6. The transmitter of claim 4, further comprising a transmitter circuit, communicatively coupled with the signal combiner, for wirelessly transmitting the single combined signal comprising frequency division multiplexed signals as a plurality of wideband integrated digitally enhanced network (WiDEN) signals.

7. A communication system comprising:

a wireless network comprising at least one cell; and at least one wireless device for wireless communication with the at least one cell, the at least one wireless device comprising:

a processor/controller for processing signals of the at least one wireless device; and a transmitter, communicatively coupled to the processor, for
receiving signals from the processor,
creating at least two sampled carrier data streams, in response to the received signals,
running each of the at least two sampled carrier data streams through a separate delay block, and wherein each separate delay block adds delay of less than 20% of a corresronding symbol time,
mixing each delayed one of the at least two sampled carrier data streams over in frequency an appropriate amount, resulting in at least two frequency division multiplexed signals,
combining the at least two frequency division multiplexed signals together, and
transmitting the combined at least two frequency division multiplexed signals.

8. The communication system of claim 7, wherein the transmitter for transmitting the combined at least two frequency division multiplexed signals representing wideband integrated digitally enhanced network (WiDEN) signals.

9. A computer readable medium comprising computer instructions for a wireless device performing the following steps of:

creating at least two sampled carrier data streams;

running each one of the at least two sampled carrier data streams through a separate delay block to add delay thereto, and wherein each separate delay block adds delay of less than 20% of a corresponding symbol time;

mixing each delayed one of the at least two sampled carrier data streams over in frequency an appropriate amount, resulting in at least two frequency division multiplexed signals; and combining the at least two frequency division multiplexed signals together.

10. The computer readable medium of claim 9, further comprising computer instructions for the wireless device wirelessly transmitting the combined at least two frequency division multiplexed signals.

11. The computer readable medium of claim 9, further comprising computer instructions for the wireless device wirelessly transmitting the combined at least two frequency division multiplexed signals as wideband integrated digitally enhanced network (WiDEN) signals.

12. The computer readable medium of claim 9, wherein the at least two sampled carrier data streams each comprises a bandwidth of 25 kHz.

13. The computer readable medium of claim 9, wherein the at least two sampled carrier data streams each comprises a bandwidth of 25 kHz, and wherein each separate delay block adds delay of less than 20% of a corresponding symbol time, and the computer readable medium further comprising computer instructions for the wireless device wirelessly transmitting the combined at least two frequency division multiplexed signals as wideband integrated digitally enhanced network (WiDEN) signals.

* * * * *